Dec. 7, 1937.   P. SHAFFER   2,101,758
ELECTROMAGNETIC GAS TANK LOCK
Filed Nov. 9, 1936   2 Sheets-Sheet 1
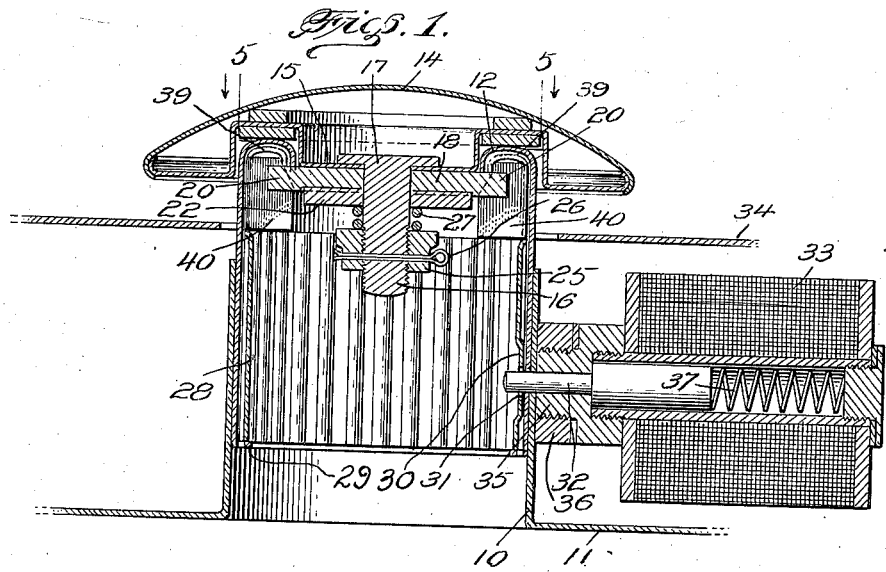
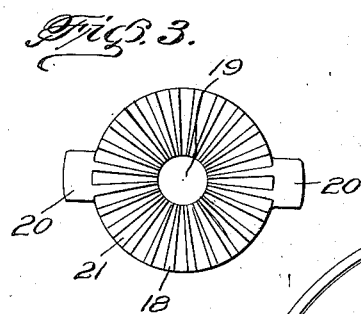
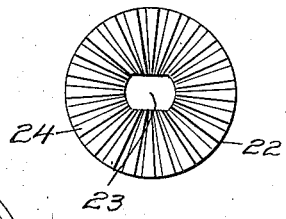
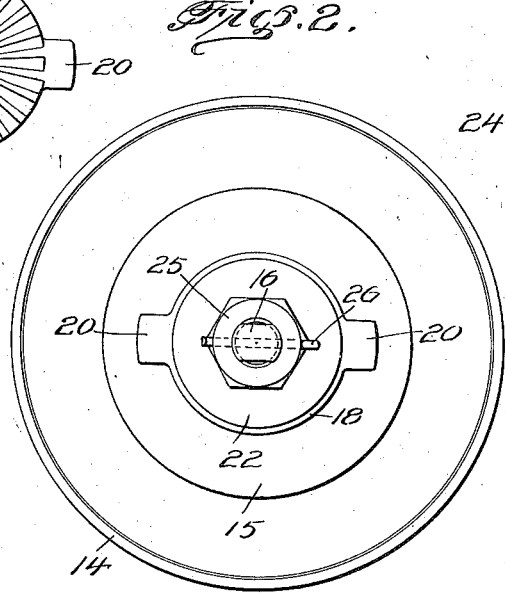
Phillip Shaffer, INVENTOR
BY Victor J. Evans & Co.
ATTORNEYS Dec. 7, 1937.  P. SHAFFER  2,101,758
ELECTROMAGNETIC GAS TANK LOCK
Filed Nov. 9, 1936  2 Sheets-Sheet 2
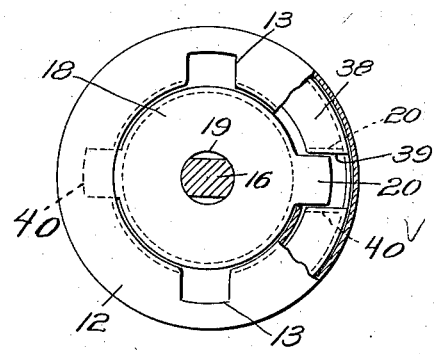
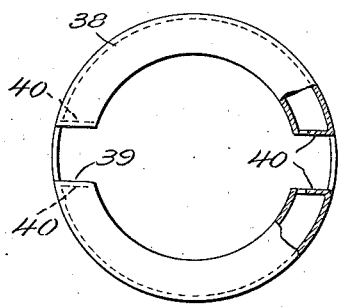
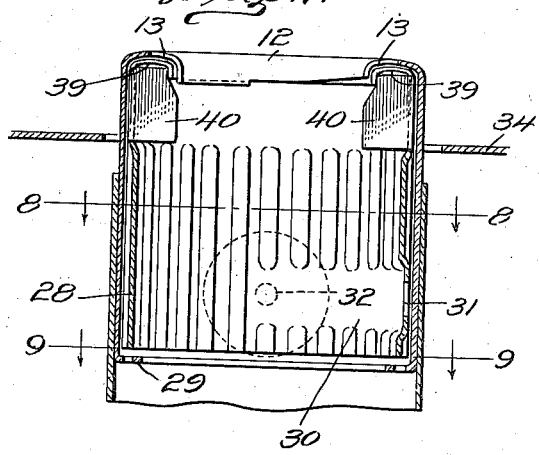
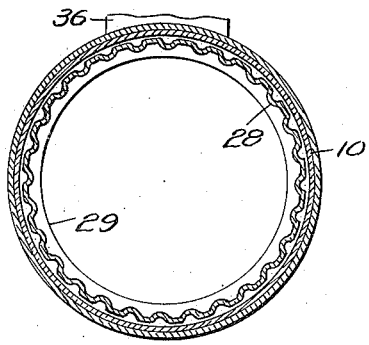
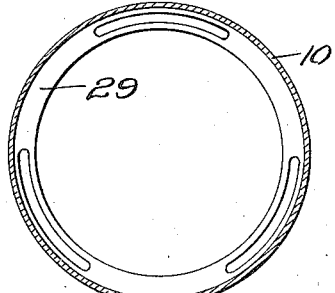

Patented Dec. 7, 1937

2,101,758

UNITED STATES PATENT OFFICE 2,101,758

ELECTROMAGNETIC GAS TANK LOCK

Phillip Shaffer, Mitchell, Nebr.

Application November 9, 1936, Serial No. 110,015

3 Claims. (Cl. 292—144)

This invention relates to electromagnetic gas tank locks and has for an object to provide a novel slip clutch assembled with the tank cap to permit the cap to swivel in locked position, when an attempt is made surreptitiously to pilfer fuel, and prevent breakage of the parts.

A further object is to provide a novel retaining disc locking tube and retaining disc for locking the cap in closed position.

A further object is to provide a solenoid having a spring pressed plunger adapted to hold the locking tube against rotation until the solenoid is energized, the plunger being withdrawn to neutral position when the solenoid is energized and frictionally engaging a seat on the locking tube to yieldably hold the locking tube against accidental rotation due to vibration when the cap is removed.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view through an electromagnetic gas tank lock constructed in accordance with the invention.

Figure 2 is a bottom plan view of the filling tube cap.

Figure 3 is a bottom plan view of the retaining disc and showing the clutch face thereof.

Figure 4 is a top plan view of the clutch disc showing the clutch face thereof.

Figure 5 is a cross sectional view taken on the line 5—5 of Figure 1 looking in the direction of the arrow-heads with portions broken away to show the lugs of the locking disc in position to lock the cap against removal.

Figure 6 is a plan view of the locking tube with portions broken away to show the lips of the tube.

Figure 7 is a longitudinal sectional view through the filling tube and locking tube with the cap removed.

Figure 8 is a cross sectional view taken on the line 8—8 of Figure 7 looking in the direction of the arrowheads.

Figure 9 is a cross sectional view of the filling tube with the locking tube removed and taken on the line 9—9 of Figure 7.

Referring now to the drawings in which like characters of reference designate similar parts in the various views, 10 designates a filling tube of an automobile gasoline tank 11, the tube having an inwardly curved flange 12 at the top provided with oppositely disposed slots 13, best shown in Figures 5 and 7.

The cap 14 is provided with a depressed central portion which as usual is inserted in the filling tube. The bottom wall 15 of the depressed portion is provided with a central opening of substantially oblong contour to receive a bolt 16 the sides of which are cut away from the end of the bolt to the head 17 thereof to conform to the contour of the opening and to be non-rotatably received therein.

A retaining disc 18, forming one member of a slip clutch, is provided with a circular central opening 19 to rotatably receive the neck of the bolt. The disc is provided at diametrically opposite points with locking lugs 20 and the bottom face of the disc is corrugated radially as shown at 21 to provide a clutch face. A clutch disc 22 is provided with a substantially oblong central opening 23 to non-rotatably receive the bolt 16 below the retaining disc. The clutch disc is corrugated radially as shown at 24 on the top face to provide a clutch face which confronts the clutch face of the retaining disc. The bolt is equipped with a nut 25 which is anchored against escape by a cotter pin 26. A helical spring 27 is sleeved on the bolt between the nut and the clutch disc 22 and yieldably holds the clutch disc in frictional engagement with the retaining disc.

A retaining disc locking tube 28 is rotatably mounted in the filling tube above an inturned flange 29 formed on the bottom of the filling tube 10, as best shown in Figures 7 and 9. The locking tube is corrugated longitudinally and the corrugations are interrupted transversely to form a seat 30 at one end of which an opening 31 is formed to receive a plunger 32 for holding the locking tube stationary.

The plunger is mounted in the bore of a solenoid 33 which is fixed to the side of the filling tube below the apron 34 which conceals the gasoline tank 11. The solenoid is provided with a threaded stud 35 which is received in a threaded socket 36 on the filling tube to mount the solenoid. A helical spring 37 is confined under tension in the bore of the solenoid and tends constantly to urge the plunger against the locking tube. Thus the plunger frictionally engages the seat when the locking tube is rotated axially to unlock the cap, and prevents too free rotation of the locking tube.

The locking tube is provided at the upper end with a downwardly curved flange 38, which is nested in the similarly shaped flange 12 of the filling tube and is provided with oppositely disposed slots 39 adapted to align with the similar slots 13 of the filling tube flange when the locking tube is rotated to unlock the cap 14 as will be presently described. A pair of lips 40 are arranged at the ends of each slot 39 in the locking tube flange and the lugs 20 of the retaining disc 18 are received between the lips, as best shown in Figures 1 and 5.

When the cap 14 is rotated, after the plunger 32 has been withdrawn from the locking tube by energizing the solenoid, the lugs 20 will move the locking tube with the cap as a unit until the slots 13 and 39 of the filling tube and locking tube flanges come into registration whereupon the cap may be removed vertically from the filling tube. When replaced, the cap may be rotated in a reverse direction, the lugs 20 then rotating the locking tube sufficiently to bring the opening 31 of the locking tube into registration with the plunger, whereupon the plunger springs into the opening and holds the locking tube stationary. At this time the lugs 20 are disposed underneath the downwardly curved flange 12 of the filling tube, as best shown in Figures 1 and 5, and lock the cap against being removed vertically from the filling tube.

By virtue of the opening 19 in the retaining disc rotatably receiving the bolt 16 the cap 14, bolt 16, and clutch disc 22 may be freely swivelled as a unit on the filling tube, such movement being retarded to a certain extent by slipping of the clutch face of the clutch disc upon the clutch face of the retaining disc. The retaining disc 18 remains stationary during such swivelling movement of the cap by virtue of the lugs 20 being disposed between the lips 40 of the locking tube, and the locking tube itself being held stationary by the plunger 32.

The solenoid may be energized through suitable circuit wires controlled by a switch within convenient reach of the driver so that the plunger 32 may be withdrawn. The switch may be opened after the plunger is withdrawn and after the cap has been rotated sufficiently to carry the opening 31 out of registration with the plunger thus economizing in current.

From the above description it is thought that the construction and operation of the invention will be fully understood without further explanation.

What is claimed is:

1. A gas tank lock for a tank having a flanged filling tube and a cap having a portion insertable in the tube, said lock comprising a retaining disc having a slip clutch connection with the cap permitting the cap to swivel when the locking tube is in locked position, a spring pressed plunger on the filling tube adapted to engage the locking tube to lock the tube stationary, withdrawal of the plunger permitting the locking tube to be rotated to released position, and locking lugs projecting from one of the slip clutch members and engageable underneath the flange of the filling tube for locking the cap to the tube, said lugs being slidably connected to the locking tube and being rotatable with the locking tube when connected therewith.

2. A gas tank lock for a tank having a flanged filling tube and a cap having a portion insertable in the tube, said lock comprising a retaining disc having a slip clutch connection with the cap, and provided with locking lugs engageable underneath the flange of the filling tube to prevent vertical removal of the cap, a locking tube rotatably mounted in the filling tube, lips on the locking tube engageable with the lugs for connecting the locking tube and the retaining disc for rotation as a unit, there being registering slots in the flange of the filling tube and in the locking tube permitting vertical removal of the cap and retaining disc when the locking tube is rotated axially, and a spring pressed plunger on the filling tube engageable with the locking tube to lock the locking tube against rotation.

3. A gas tank lock for a tank having a flanged filling tube and a cap having a portion insertable in the tube, said lock comprising a retaining disc having a slip clutch connection with the cap, a locking tube having a downwardly curved flange at the top nested in the flange of the filling tube, there being slots in both flanges adapted to be brought into registration by rotation of the locking tube, locking lugs on the retaining disc adapted to pass vertically through the slots of both flanges to permit removal of the cap, lips on the locking tube engaging the lugs for connecting the locking tube and retaining disc to rotate as a unit to bring said lugs into or out of registration with said slots, a circumferentially disposed seat on the locking tube, a spring pressed plunger carried by the filling tube and frictionally engaging said seat when the locking tube is rotated to prevent too free rotation, there being an opening in said seat into which the plunger projects to lock the locking tube stationary, and means for withdrawing the plunger from said opening to release the locking tube.

PHILLIP SHAFFER.